United States Patent [19]

Matsumoto

[11] Patent Number: 4,477,641

[45] Date of Patent: Oct. 16, 1984

[54] CURABLE SILICONE COMPOSITION

[75] Inventor: Yasuji Matsumoto, Nitta, Japan

[73] Assignee: Toshiba Silicone Co., Ltd., Tokyo, Japan

[21] Appl. No.: 574,804

[22] Filed: Jan. 30, 1984

[30] Foreign Application Priority Data

Feb. 21, 1983 [JP] Japan .................................. 58-26284

[51] Int. Cl.³ .............................................. C08G 77/06
[52] U.S. Cl. ..................................... 528/15; 525/478; 528/31; 528/32
[58] Field of Search ............................ 528/15, 31, 32; 525/478

[56] References Cited

U.S. PATENT DOCUMENTS 4,273,902 6/1981 Tomioka et al. ....................... 528/15
4,311,821 1/1982 Weitemeyer et al. ................. 528/15

Primary Examiner—Melvyn I. Marquis
Attorney, Agent, or Firm—Gary L. Loser

[57] ABSTRACT

A curable silicone composition comprising:
(A) an organopolysiloxane having in the molecule at least two alkenyl groups and at least two alkoxy groups;
(B) an organopolysiloxane having in the molecule at least two hydrogen atoms bonded directly to silicon atoms, and
(C) a catalyst based on platinum, palladium or rhodium for the addition reaction.

11 Claims, No Drawings

CURABLE SILICONE COMPOSITION

BACKGROUND OF THE INVENTION

The present invention relates to a curable silicone composition. More particularly, the present invention relates to an organopolysiloxane composition capable of undergoing both addition and condensation reactions.

As conventional curable silicone compositions there are known organopolysiloxane compositions of the addition reaction type and the condensation reaction type.

The organopolysiloxane composition of the addition reaction type is characterized in that an organopolysiloxane having an alkenyl group and an organopolysiloxane having a hydrogen atom bonded directly to the silicon atom are cured by a catalyst for the addition reaction such as a platinum compound (see, for example, Japanese Patent Publication No. 27853/1968). This composition is advantageous in that since no by-product is formed in the curing step, the composition is uniformly cured even to the interior and since the curing degree is controlled by heating, the curing time or serviceable life can be adjusted. Accordingly, this composition has been broadly used, mainly as a potting or coating material for electric and electronic parts.

The organopolysiloxane composition of the condensation reaction type is characterized in that a hydroxyl group-containing organopolysiloxane and a hydrolyzable crosslinking agent are cured by a tin compound or the like (see, for example, Japanese Patent Publications No. 16798/1963 and No. 21631/1965). This composition is advantageous in that since the composition is cured at room temperature by the moisture contained in air, the processability is good, insufficient coating is hardly caused and if absorption of the moisture is prevented, the composition can be stably stored in one package. Accordingly, the composition is used as a sealant for construction, an industrial adhesive, a potting material, a coating material, a mold-making material and as a roller of a copying machine.

However, the known organopolysiloxane compositions of the addition reaction type are defective in that insufficient curing is caused on a surface containing a catalyst poison such as a compound of nitrogen, phosphorus, tin or sulfur. Thus the composition cannot be used on such a surface. The composition is ordinarily of the two-package type, but if a reaction regulator or the like is used to change the composition to a one-package type, heating at a relatively high temperature is necessary for curing. Moreover, since the amount of the catalyst is reduced so as to maintain good stability at room temperature, insufficient curing often results.

The known organopolysiloxane compositions of the condensation reaction type are defective in that since the composition is cured by moisture, the interior is not promptly cured even after the surface has been cured. Even if heating is performed so as to promote curing, no substantial promoting effect can be attained. Therefore, although the compositions of this type are excellent in processability, the composition is disadvantageous in that the composition can be used only for situations requiring relatively small thickness.

The object of the present invention is to overcome the defects of the above-mentioned organopolysiloxane compositions of the addition reaction and condensation reaction types. More specifically, it is a primary object of the present invention to provide a curable silicone composition in which the defects of organopolysiloxanes of the addition reaction type, that is, insufficient curing and the necessity of heating for curing in the case of one-package type compositions, and the defects of organopolysiloxane of the condensation type, that is, delayed curing of the interior and no substantial promotion of curing by heating are eliminated, while only the merits of the organopolysiloxanes of the addition reaction and condensation reaction types are retained. In other words, the present invention provides a curable silicone composition in which insufficient curing does not result, curing is advanced at room temperature even in the case of a one-package type composition and curing is promoted by heating.

SUMMARY OF THE INVENTION

In accordance with the present invention, there is provided a curable silicone composition comprising (A) an organopolysiloxane having in the molecule at least two alkenyl groups and at least two alkoxy groups (B) an organopolysiloxane having in the molecule at least two hydrogen atoms bonded directly to silicon atoms and (C) a catalyst based on platinum, palladium or rhodium for the addition reaction.

DESCRIPTION OF THE INVENTION

The organopolysiloxane used as component (A) in the present invention is a component for rendering the composition of the present invention capable of undergoing both addition and condensation reactions. Accordingly, component (A) is an organopolysiloxane having in the molecule at least two alkenyl groups and at least two alkoxy groups. The positions of the alkenyl and alkoxy groups in the molecule are not particularly critical.

The organopolysiloxane component (A) may have any of linear, branched, cyclic, reticular or three-dimensional molecular structures. Furthermore, a homopolymer, a copolymer, or mixture thereof may be used.

As the organic groups bonded to the silicon atom, other than alkenyl and alkoxy groups, in organopolysiloxane component (A), there can be generally mentioned substituted and unsubstituted monovalent hydrocarbon radicals. As specific examples, there can be mentioned alkyl groups such as methyl, ethyl, propyl, butyl, and octyl groups; aryl groups such as phenyl, xenyl and naphthyl groups, and fluoro-substituted alkyl groups such as the 3,3,3-trifluoropropyl group. These silicon-bonded organic groups may all be the same or mixtures of different substituted and unsubstituted hydrocarbon groups.

The alkenyl groups in organopolysiloxane component (A) of the present invention react with the hydrosilyl groups of component (B) by addition reaction in the presence of catalyst component (C). Such addition curing gives a heating curability and an interior curability to the composition of the present invention. As examples of suitable alkenyl groups, there can be mentioned vinyl and allyl groups.

The alkoxy groups in organopolysiloxane component (A) of the present invention give moisture-curability at room temperature to the composition of the present invention and also act as a functional group for effecting crosslinking necessary for curing when insufficient curing of the organopolysiloxane of the addition reaction type is caused by the presence of poisons such as tin, nitrogen, sulfur and phosphorus. Therefore, the alkoxy groups are very important for the composition of the present invention. As suitable alkoxy groups there can be mentioned, for example, methoxy, ethoxy, propoxy and butoxy groups.

The organopolysiloxane component (A) may contain hydroxyl groups in addition to the alkenyl and alkoxy groups and the above-mentioned organic groups. When the content of the hydroxyl group is high, a spongy cured product is obtained. When a foam-free homogeneous cured product such as an insulating and protecting material in the electric or electronic field, is required or the composition is used as a one-package type composition, it is preferred that such hydroxyl groups be not substantially contained in organopolysiloxane component (A). In contrast, when the composition is used in the form of a two-package composition and a spongy cured product is desired, it is preferred that a hydroxy group-containing organopolysiloxane, especially an organopolysiloxane having hydroxyl groups on both ends, be used in combination therewith.

An organopolysiloxane which is solid at room temperature may be used as component (A) as it can be melted by heating. However, from the viewpoint of processability it is preferred that the viscosity of organopolysiloxane component (A) be from 1 to about 1,000,000 cP, especially 20 to 200,000 cP, as measured at 25° C.

The organopolysiloxane component (A) may be synthesized according to various processes. For example, when an alkenyl group-containing polysiloxane represented by the following mean formula:

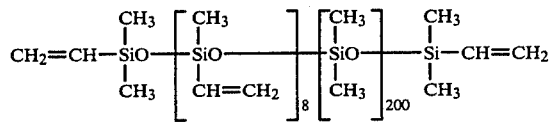

is subjected to a partial addition reaction with a silane such as HSi (OC$_2$H$_5$)$_3$ in the presence of an addition reaction catalyst such as a platinum compound, an organopolysiloxane represented by the following formula:

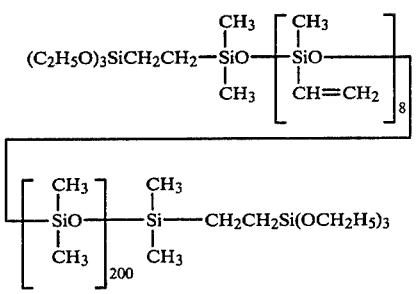

is obtained. Furthermore, when a hydroxyl group-containing polysiloxane represented by the following mean formula:

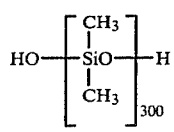

is subjected to a demethanolation reaction with $$CH_2=CH-Si(OCH_3)_3,$$

an organopolysiloxane represented by the following formula:

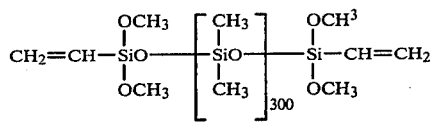

is obtained. A condensation promotor may be used in effecting this dealcoholation/condensation reaction. As the condensation promotor, there may be used metal salts of organic acids, such as iron 2-ethylhexoate, titanium naphthate, zinc stearate and dibutyltin diacetate, organic titanium esters such as tetrabutyl titanate and tetra(isopropenyloxy) titanate, an alkoxyaluminum compound, aminoalkyl-substituted alkoxysilanes such as 3-aminopropyltriethoxysilane and N-(trimethoxysilylpropyl)ethylenediamine, hexylamine and octylamines and salts. Moreover, an organopolysiloxane can be obtained by subjecting an alkenyl group-containing, three-dimensional polysiloxane represented by the following formula:

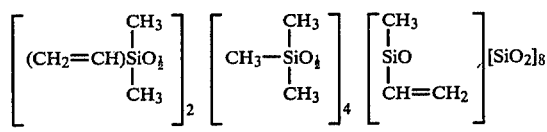

to a partial addition reaction with HSi(CH$_3$) (OCH$_3$)$_2$ in the presence of an addition catalyst such as a platinum compound. Still further, an organopolysiloxane may be obtained by an equilibrium reaction between an alkenyl group-containing polysiloxane and an alkoxy group-containing polysiloxane.

As the organopolysiloxane used as component (B) in the present invention, any organopolysiloxane cutomarily used for an addition reaction may be used provided such organopolysiloxane has at least two hydrogen atoms bonded directly to silicon atoms.

The organopolysiloxane component (B) may have linear, branched, reticular or three-dimensional molecular structures. A homopolymer, a copolymer or mixture thereof may also be used.

The organopolysiloxane component (B) has organic groups in addition to the hydrogen atoms bonded directly to silicon atoms. Generally, substituted or unsubstituted monovalent hydrocarbon groups can be mentioned as suitable organic groups. As specific examples there can be mentioned alkyl groups such as methyl, ethyl, propyl, butyl and octyl groups, aryl groups such as phenyl, xenyl and naphthyl groups, and fluoro-substituted groups such as the 3,3,3-trifluoropropyl group. These silicon-bonded organic groups may all be the same or mixtures of different substituted and unsubstituted hydrocarbon groups.

The viscosity of the organopolysiloxane used as component (B) ranges from about 0.5 to about 10,000 cP, preferably 1 to 1,000 cP, as measured at 25° C.

Organopolysiloxane component (B) is used in an amount such that the number of hydrogen atoms bonded directly to silicon atoms ranges from about 0.5 to about 10 equivalents, preferably 0.75 to 4 equivalents, to that of the alkenyl groups contained in component (A). If the amount of hydrogen atoms is smaller than 0.5 equivalent or larger than 10 equivalents the crosslinking degree is affected such that the physical properties of the cured product are reduced, blowing is readily caused at the curing step, and the physical properties of the cured product are readily changed at high temperatures.

The addition catalyst used as component (C) in the present invention is a catalyst for an addition reaction of the alkenyl group of component (A) with the hydrosilyl group of component (B). As the addition catalyst there can be mentioned those based on platinum such as chloroplatinic acid, alcohol-modified chloroplatinic acid, a platinum-olefin complex, a platinumketone complex, a platinum-vinylsiloxane complex, platinum supported on a carrier such as alumina or silica and platinum black; palladium catalysts such as tetrakis-(triphenylphosphine)palladium and a mixture of palladium black and triphenylphosphine, and rhodium catalysts. Component (C) is normally used in an amount such that the amount of the platinum, palladium or rhodium element is present at about 0.1 to about 1,000 ppm, preferably 0.3 to 200 ppm, based on the sum of the components (A) and (B). Component (C) is ordinarily expensive because it contains a noble metal, and hence even if component (C) is used in an amount exceeding the above range, no significant effect is obtained.

The composition of the present invention may be formed into a two-package type composition in which part of component (A) and addition catalyst component (C) are included in one package and the remainder of component (A) and component (B) are included in another package. Furthermore, the composition of the present invention may be formed into a three-package type composition in which components (A) and (B) and the addition reaction catalyst component (C) are included in three separate packages. However, an acetylenic compound or a platinum catalyst having a low activity at room temperature must be used. However, in each case, since the composition of the present invention is cured by moisture, it is necessary to store the composition in a sealed state.

The composition of the present invention comprises components (A) and (B) and the addition catalyst (C) as the basic indispensable components. A filler, a pigment, a heat resistance improver, an adhesive, a flame retardant and a mildewproofing agent may optionally be added to the composition of the present invention if needed. Furthermore, a solvent may be used in combination with the composition of the present invention or other organopolysiloxanes may be used in combination with the composition of the present invention so long as the intended effects of the present invention are attained. As the filler additive to be optionally used, there can be mentioned, for example, fumed silica, precipitated silica, quartz powder, diatomaceous earth, titanium oxide, aluminum oxide, zinc oxide, iron oxide, cerium oxide, mica, clay, carbon black, graphite, calcium carbonate, zinc carbonate, manganese carbonate, cerium hydroxide, glass beads, metal power, toluene, hexane, dimethylpolysiloxane and alkenyl group-containing polysiloxane.

The present invention will now be described in detail with reference to the following examples, in which all parts are by weight and the viscosity is measured at 25° C.

EXAMPLE 1 AND COMPARATIVE EXAMPLES 1 THROUGH 4

The compositions of Example 1 and Comparative Examples 1 through 4 were prepared by mixing the following ingredients as indicated in Table I.

Polysiloxane I: dimethylpolysiloxane represented by the following means formula:

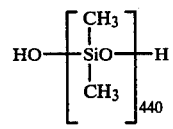

and having hydroxyl groups on both ends and a viscosity of 2,200 cP.

Polysiloxane II: dimetylpolysiloxane represented by the following mean formula:

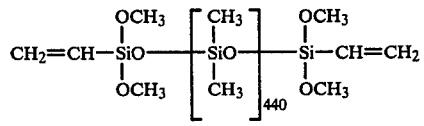

and having vinyl and methoxy groups and a viscosity of 2,400 cP, which was obtained by heating under stirring 100 parts of polysiloxane I, 4 parts of $CH_2=CH-Si(OCH_3)_3$, 0.1 part of dibutylamine snd 0.01 part of acetic acid at 100° C. for 8 hours, while flowing nitrogen little by little, to effect the demethanolation reaction.

Polysiloxane III: vinyl group-containing dimethylpolysiloxane represented by the following mean formula:

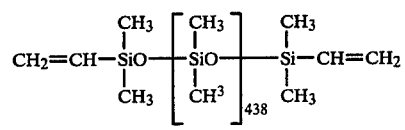

and having a viscosity of 2,300 cP.

Polysiloxane A: dimethylhydrogen-polysiloxane represented by the following mean formula:

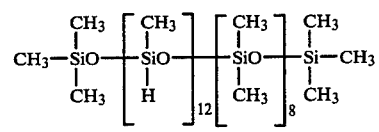

and having hydrogen atoms bonded to silicon atoms and a viscosity of 8 cP.

Silane A: vinyl group-containing methoxysilane represented by the formula $CH_3=CH-Si(OCH_3)_3$.

Platinum A: isopropyl alcohol solution of chloroplatinic acid containing 2% by weight of platinum.

TABLE 1

| Ingredients (parts) | Example 1 | Comparative Example 1 | Comparative Example 2 | Comparative Example 3 | Comparative Example 4 |
|---|---|---|---|---|---|
| Polysiloxane I | — | 100 | 100 | — | — |
| Polysiloxane II | 100 | — | — | — | — |
| Polysiloxane III | — | — | — | 100 | 100 |
| Polysiloxane A | 1.6 | 1.6 | 1.6 | 1.6 | 6.6 |
| Silane A | — | — | 4 | — | 4 |
| Platinum A | 0.05 | 0.05 | 0.05 | 0.05 | 0.05 |

The compositions of Example 1 and Comparative Examples 1 through 4 were heated and cured at 100° C. for 1 hour. The blowing state and rubber hardness were as shown in Table 2. When the hydroxyl group-containing polysiloxane was used as in Comparative Example 1, or when the hydroxyl group-containing polysiloxane was mixed with silane A as in Comparative Example 2, blowing was caused. In contrast, in case of the composition of Example 1, no blowing was caused.

TABLE 2

| | Blowing | Rubber Hardness |
|---|---|---|
| Example 1 | not observed | 6 |
| Comparative Example 1 | observed | — |
| Comparative Example 2 | observed | — |
| Comparative Example 3 | not observed | 16 |
| Comparative Example 4 | not observed | 8 |

Then 100 parts of polysiloxane I was mixed with 2 parts of Si(OC$_2$H$_5$)$_4$ which had been partially hydrolyzed so that the SiO$_2$ content was about 40% and also with 0.5 part of dibutyltin dilaurate, and the mixture was allowed to stand still at room temperature for 3 days, whereby a rubber sheet was formed. The above-mentioned composition was placed on the rubber sheet and heated at 100° C. for 1 hour. The obtained results are shown in Table 3.

TABLE 3

| | Curing State of Surface in Contact with Rubber |
|---|---|
| Example 1 | cured |
| Comparative Example 1 | sticky |
| Comparative Example 2 | sticky |
| Comparative Example 3 | sticky |
| Comparative Example 4 | sticky |

From the foregoing results it is seen that in the composition of the present invention insufficient curing is not caused by a catalyst poison such as dibutyltin dilaurate.

EXAMPLE 2

A composition comprising one package (1) including a main component composed of 50 parts of polysiloxane II and 0.05 part of platinum A and another package (2) including a curing agent component composed of 50 parts of polysiloxane II and 1.6 parts of polysiloxane A was prepared. The composition was stored in both an open and a sealed state. In each case changes in viscosity were examined. When the composition was stored in the open state both the main component and the curing agent component gelled in 4 days, but when the composition was stored in the sealed state, the viscosity was hardly increased even after the lapse of 3 months.

EXAMPLE 3 AND COMPARATIVE EXAMPLE 5

One-package compositions of example 3 and Comparative Example 5 were prepared by adding 2 parts of a polysiloxane represented by the following average formula.

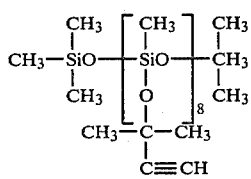

to each of the compositions of Example 1 and Comparative Example 3. When the compositions of Example 3 and Comparative Example 5 were stored in a sealed state at room temperature the viscosity was hardly changed even after the lapse of 1 month. When the compositions were stored in an open state at room temperature, gelation was caused from the surface in the composition of Example 3 after the lapse of 4 days, but in case of the composition of Comparative Example 5 no gelation was caused at all even after the lapse of 1 month. This means that when the composition of the present invention is formed into a one-pack composition the composition has a good storage stability in a sealed state and can be cured by the moisture at room temperature.

I claim:

1. A curable silicone composition comprising (A) an organopolysiloxane having in the molecule at least two alkenyl groups and at least two alkoxy groups, (B) an organopolysiloxane having in the molecule at least two hydrogen atoms bonded directly to silicon atoms and (C) a catalyst based on platinum, palladium or rhodium for the addition reaction.

2. A curable silicone composition as set forth in claim 1, wherein organopolysiloxane component (A) is a linear organopolysiloxane.

3. A curable silicone composition as set forth in claim 2 wherein organopolysiloxane component (A) is a linear organopolysiloxane obtained by partial dealcoholation reaction between an organopolysiloxane having hydroxyl groups on both ends and an alkenyl group-containing alkoxysilane.

4. A curable silicone composition as set forth in claim 1, 2 or 3 wherein organopolysiloxane component (A) has a viscosity of 20 to 200,000 cP at 25° C.

5. A curable silicone composition as set forth in claim 1 whereein organopolysiloxane component (B) has a viscosity of 1 to 1,000 cP at 25° C.

6. A curable silicone composition as set forth in claim 1, 2 or 3 wherein organopolysiloxane component (B) is present in an amount such that the number of hydrogen atoms bonded directly to silicon atoms in component (B) is from 0.5 to 10 equivalents based on the alkenyl groups contained in component (A).

7. A curable silicone composition as set forth in claim 1 wherein the addition reaction catalyst component (C) is from the group consisting of chloroplatinic acid, alcohol-modified chloroplatinic acid, a platinum-olefin complex, a platinum-ketone complex, a platinum-vinylsiloxane complex, platinum supported on alumina, platinum supported on silica and platinum black and mixtures thereof.

8. A curable silicone composition as set forth in claim 1 wherein the addition reaction catalyst component (C) is selected from the group consisting of tetrakis(triphenylphosphine) palladium and a mixture of palladium black and triphenylphosphine.

9. A curable silicone composition as set forth in claim 1 wherein the addition reaction catalyst component (C) is a catalyst based on rhodium.

10. A curable silicone composition as set forth in claim 1 wherein the amount of addition reaction catalyst component (C) is such that the amount of the platinum, palladium or rhodium element is present at a concentration of 0.1 to 1,000 ppm based on the sum of the components (A) and (B).

11. A curable silicone composition as set forth in claim 1 wherein the amount of addition reaction catalyst component (C) is such that the amount of the platinum, palladium or rhodium element is present at a concentration of 0.3 to 200 ppm based on the sum of the components (A) and (B).

* * * * *